US007806328B2

(12) United States Patent
Chakravarthy

(10) Patent No.: US 7,806,328 B2
(45) **Date of Patent: *Oct. 5, 2010**

(54) METHOD AND SYSTEM FOR UNIFIED PRESENTATION OF EVENT BOOKING SYSTEMS

(75) Inventor: Sriram Chakravarthy, San Jose, CA (US)

(73) Assignee: Rearden Commerce, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/347,656

(22) Filed: Dec. 31, 2008

(65) Prior Publication Data

US 2009/0101710 A1 Apr. 23, 2009

Related U.S. Application Data

(63) Continuation of application No. 11/396,860, filed on Mar. 31, 2006, now Pat. No. 7,506,805.

(51) Int. Cl.
*G06K 5/00* (2006.01)

(52) U.S. Cl. ........................ 235/382; 235/375; 235/487

(58) Field of Classification Search ................. 235/380, 235/487, 379, 375, 381, 485; 705/5
See application file for complete search history.

(56) References Cited

U.S. PATENT DOCUMENTS

| | | | | |
|---|---|---|---|---|
| 5,692,125 | A | 11/1997 | Schloss et al. | |
| 5,790,974 | A | 8/1998 | Tognazzini | |
| 6,104,788 | A | 8/2000 | Shaffer et al. | |
| 6,636,888 | B1 | 10/2003 | Bookspan et al. | |
| 6,836,537 | B1 | 12/2004 | Zimgibl et al. | |
| 6,898,569 | B1 | 5/2005 | Bansai et al. | |
| 7,139,722 | B2 | 11/2006 | Perrella et al. | |
| 7,373,243 | B2 | 5/2008 | Tengler et al. | |
| 7,421,401 | B2 | 9/2008 | Demsky et al. | |
| 7,506,805 | B1 | 3/2009 | Chakravarthy | |
| 2004/0064585 | A1 | 4/2004 | Doss et al. | |
| 2004/0117275 | A1 | 6/2004 | Billera | |
| 2004/0261013 | A1 | 12/2004 | Wynn et al. | |
| 2005/0192851 | A1 * | 9/2005 | Rangnekar | 705/5 |
| 2006/0168592 | A1 | 7/2006 | Andrews et al. | |
| 2007/0168243 | A1 | 7/2007 | Chen et al. | |
| 2008/0086455 | A1 | 4/2008 | Meisels et al. | |
| 2008/0167937 | A1 | 7/2008 | Coughlin et al. | |
| 2008/0195312 | A1 | 8/2008 | Aaron et al. | |
| 2009/0030609 | A1 | 1/2009 | Orttung | |
| 2009/0030769 | A1 | 1/2009 | Orttung | |
| 2009/0055235 | A1 | 2/2009 | Oral et al. | |
| 2009/0172097 | A1 | 7/2009 | O'Sullivan et al. | |

OTHER PUBLICATIONS

Farber, Dan, "Rearden Commerce Transforms Business Services," ZDNet, Feb. 27, 2005.
Rearden Commerce, "Rearden Commerce Releases New Version of Its Employee Business Services Application," Press Release, Feb. 28, 2005.

* cited by examiner

*Primary Examiner*—Edwyn Labaze
(74) *Attorney, Agent, or Firm*—Greenberg Traurig, LLP

(57) ABSTRACT

In one embodiment, a system, that may be executed as a method, is provided for managing the booking of event tickets inside a single system, regardless of the source of the tickets and how the system of each ticket provider actually works.

20 Claims, 5 Drawing Sheets

METHOD AND SYSTEM FOR UNIFIED PRESENTATION OF EVENT BOOKING SYSTEMS

CROSS-REFERENCE TO RELATED APPLICATIONS

Under 35 U.S.C. §120, this application is a continuation of U.S. patent application Ser. No. 11/396,860, filed Mar. 31, 2006, the disclosure of which is incorporated herein by reference in its entirety.

BACKGROUND OF THE INVENTION

Buying and selling event tickets has become a major industry in its own right. Increasing numbers of companies buy tickets for use by executives, customers, and employees. Many event tickets may be purchased through ticket vendors, but it can be very time-consuming to contact each vendor individually, set up a comparison table, and review and compare all the potentially available event tickets.

What is clearly needed is a system and method for managing the booking of event tickets inside a single system, regardless of the source of the tickets and how the system of each ticket provider actually works.

SUMMARY

In one embodiment, a system, that may be executed as a method, is provided for managing the booking of event tickets inside a single system, regardless of the source of the tickets and how the system of each ticket provider actually works.

DETAILED DESCRIPTION

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

Figure 1:
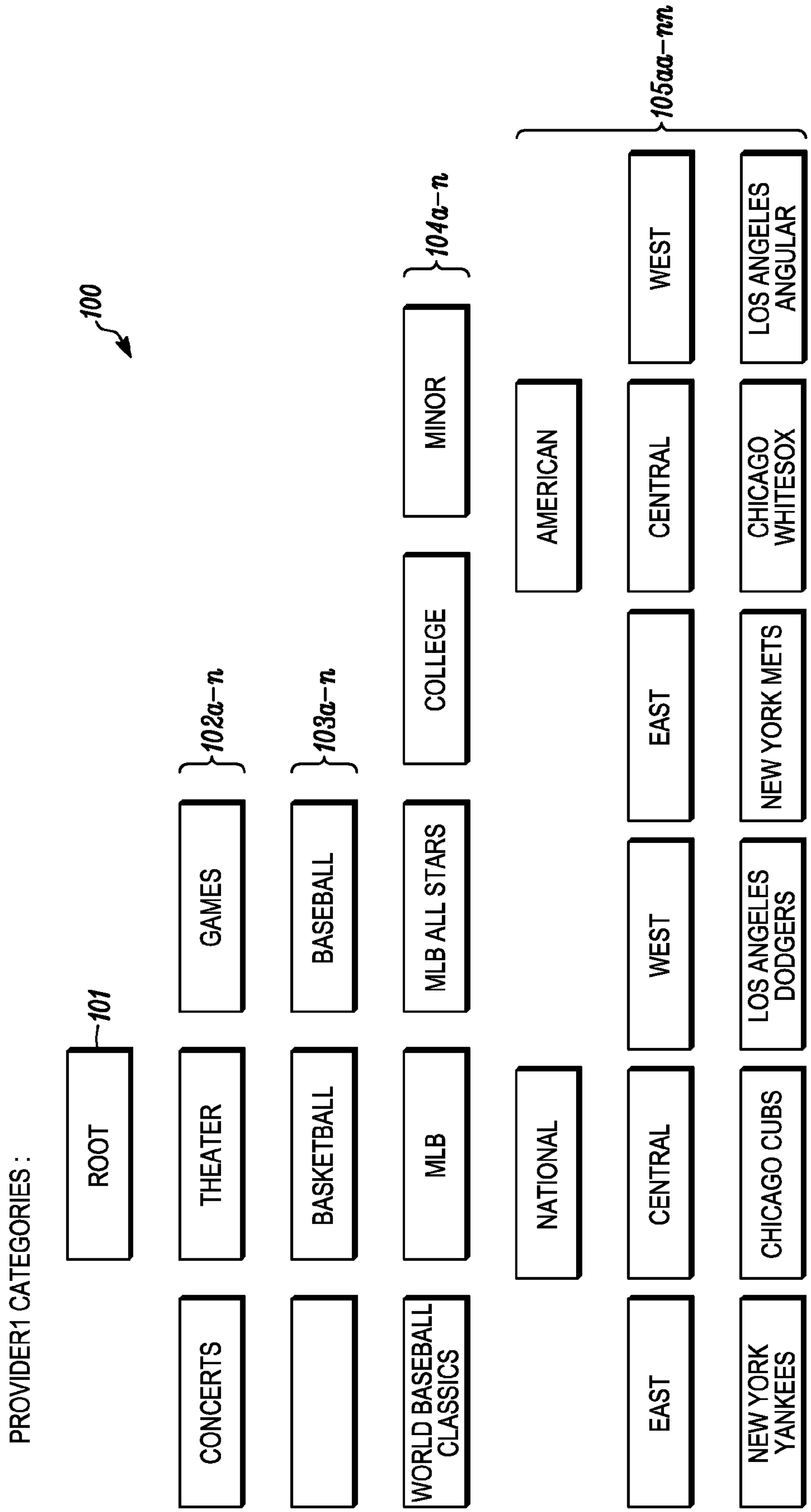
FIG. 1 shows an exemplary event categorization, sorted by ticket provider, in accordance with one embodiment.

FIG. 1 shows an exemplary event categorization 100, sorted by ticket provider, in this case starting at a root or home page 101 of Provider 1. From the root 101 of Provider 1, the user seeking tickets can navigate by event type in layer 102*a-n*. He can then, within a specific event type, such as games, search further-refined categories 103*a-n*. Within a selected sub-category, in this example baseball, the user can select a preferred type or category 104*a-n* of baseball game, such as major league, and then, in section 105*aa-nn*, he can narrow down through data layers to select a preferred league (American or National), a preferred division (Western) within the league, and hence a preferred team (Los Angeles Dodgers) within the division. Although some vendors may organize their selection tree a little differently, by and large, most vendors present their offerings in a manner similar to that shown in FIG. 1.

Figure 2:
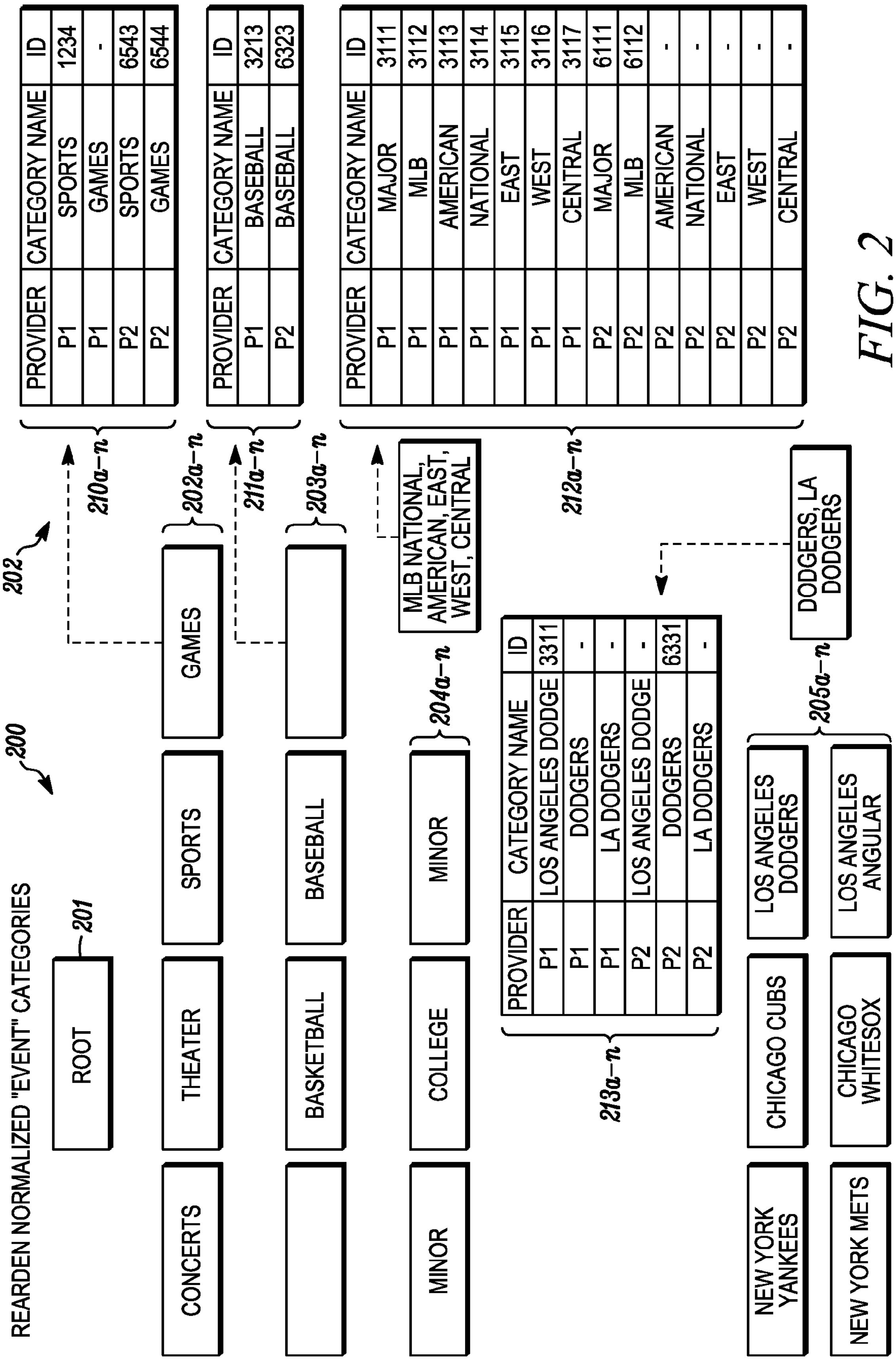
FIG. 2 shows an exemplary set of "normalized" event categories, in accordance with one embodiment.

FIG. 2 shows an exemplary set of "normalized" event categories 200 as proposed by the present invention. Again, the user would start at the home page or root 201. He can then look at various different event categories 202*a-n*, such as concerts, theater, sports, or games. Also shown is a tabular view 202 where each provider and each category is assigned a unique ID. Further, in table 202, for the normalized event categories of tree 200, an ID for each category group (i.e., 210*a-n*, 211*a-n*, 212*a-n*, 213*a-n*, etc.) may be given as a unified ID (not shown in FIG. 2). This unified ID would represent a set of various vendors' IDs for same event (for example, in table section 213*a-n*, vendor IDs 3311 and 6331 could be represented as 52331 (LAD31) for the group, not shown in FIG. 2). As the user narrows down to a particular event through the tree layers 202*a-n*, 203*a-n*, and 204*a-n* to games 205*a-n*, the equivalent table section 213*a-n* shows, for example, two providers P1 and P2, each offering Los Angeles Dodgers tickets under various different names. Thus a user looking for "LA Dodgers" would find provider P1 category 3311 and the provider P2 category 6331 in table 213*a-n*.

Figure 3:
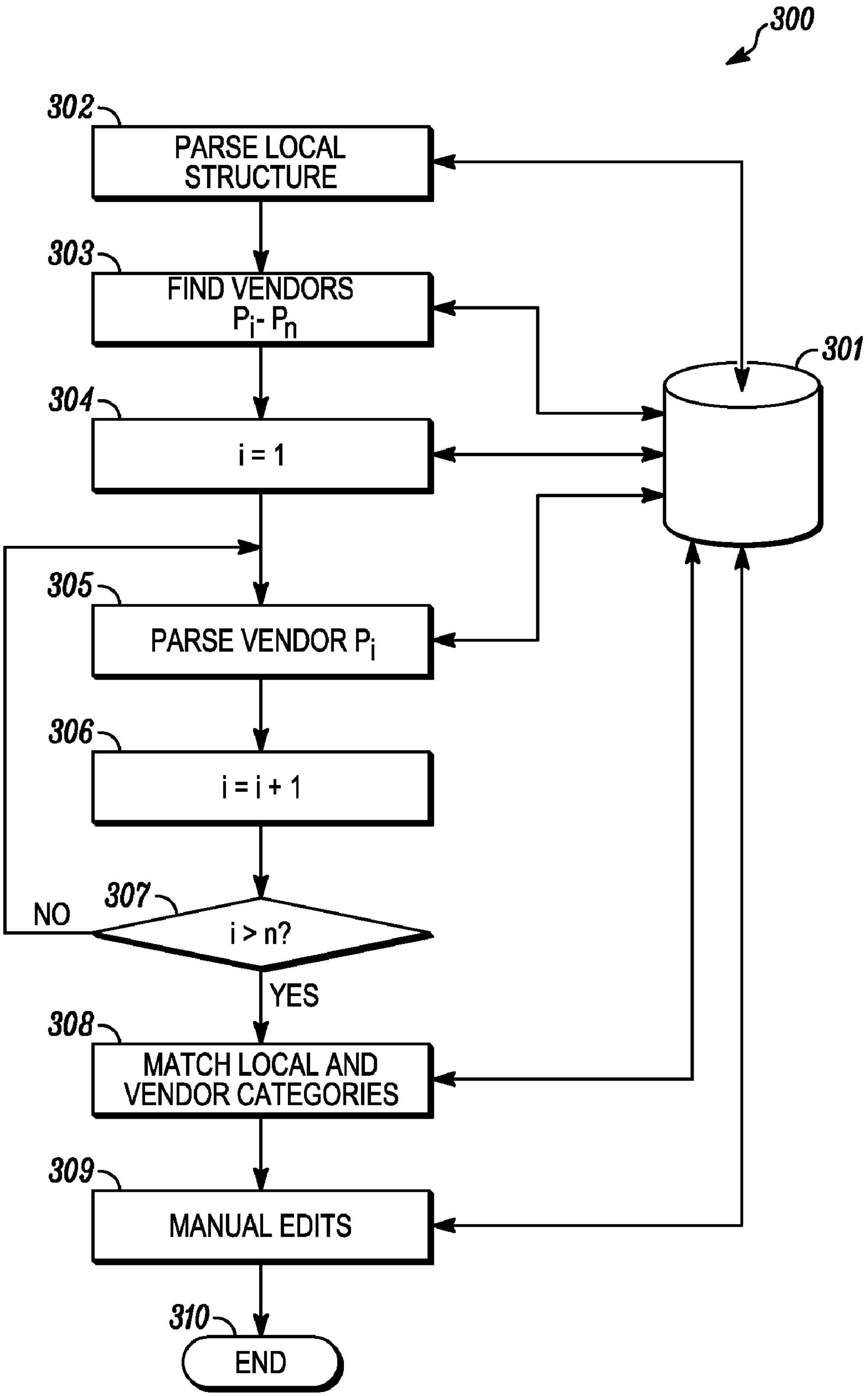
FIG. 3 shows an exemplary process flow of acquiring IDs of a vendor's data structure, in accordance with one embodiment.

FIG. 3 shows an exemplary process flow 300 of acquiring IDs of a vendor's data structure. In process 302 the system according to the present embodiment parses the local structure, i.e. the "normalized" event categories in the system and their respective IDs, drawing on data from local database 301. In process 303, the system identifies vendors (or providers) P1 through Pn. In process 304, the system sets up a loop, starting with i=1 through i=n, where i=1 indexes vendor P1, and n indexes vendor Pn. In process 305, the system parses vendor Pi (P1 . . . n). Then the system increments i by 1 in process 306 until eventually it reaches n in process 307. In process 307, the process branches. If n is not reached (no), the process loops back to process 305. If n is reached (yes), the process moves to process 308, where the system matches a category or an ID, respectively, according to the existing tree, between a vendor and the local tree whose data resides in database 301. In some cases, the system may not be able to resolve the matching. Those cases are recorded in database 301. Then in process 309, the system prompts an agent (i.e., a user) to manually edit data in database 301 in order to correct unclear data or to resolve situations where the system detects a conflict in the data that was previously stored during process 308 in database 301. Then in process 310 the process of parsing and matching ends.

Figure 4:
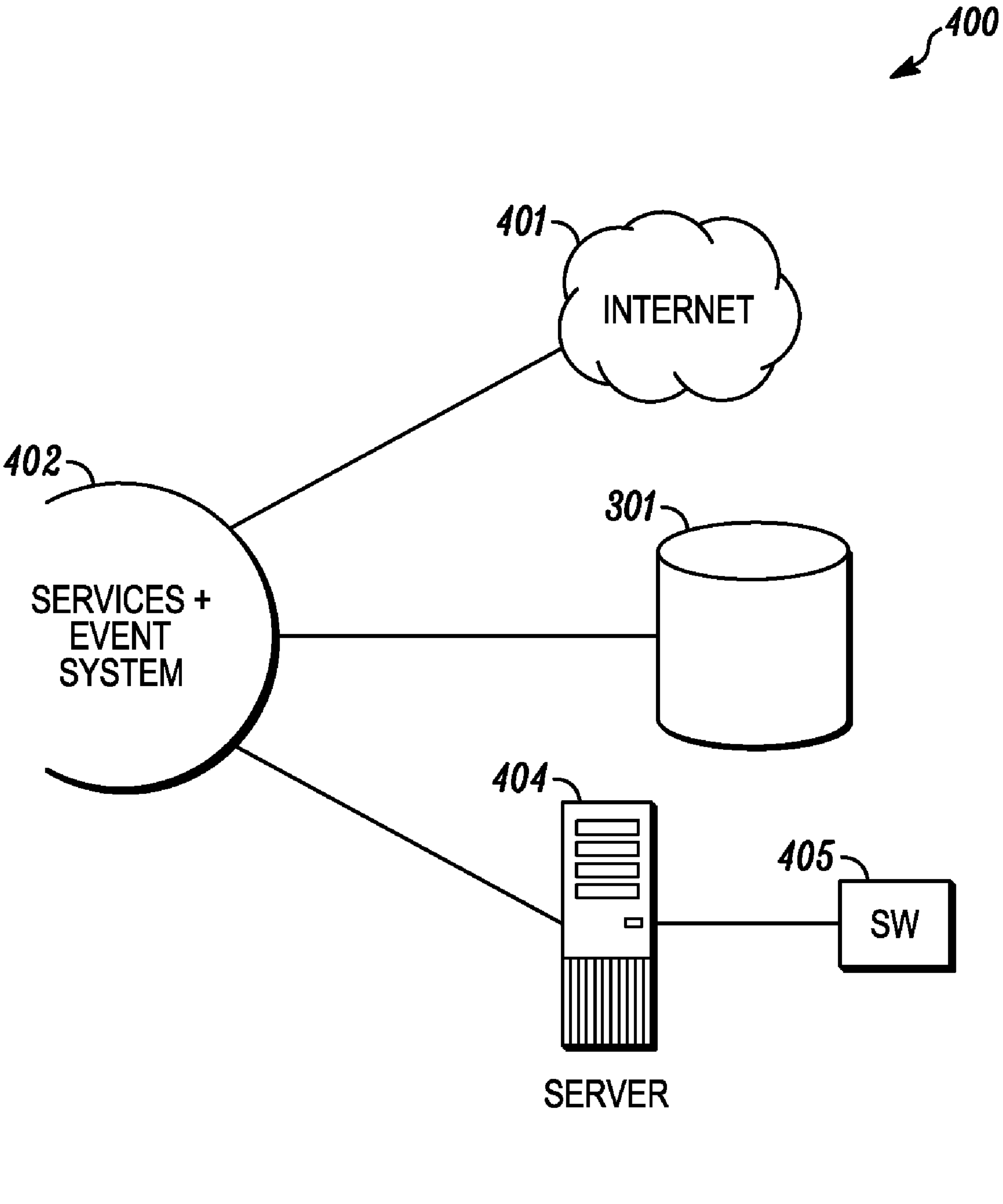
FIG. 4 illustrates an overview of a system, in accordance with one embodiment.

FIG. 4 shows an overview of such a system 400 according to the present embodiment. A services and event system 402 is running on a least one machine 404, which has a software instance 405, some aspects of which have been described in detail, but which may have additional variations. Also shown is database 301 and a connection to the Internet 401, through which the system 402 may connect to various providers. It is clear that in some cases connections to providers may be made via any of various different types of network connections, such as a private network, a virtual private network, or any other network types currently well known in the art.

Figure 5:
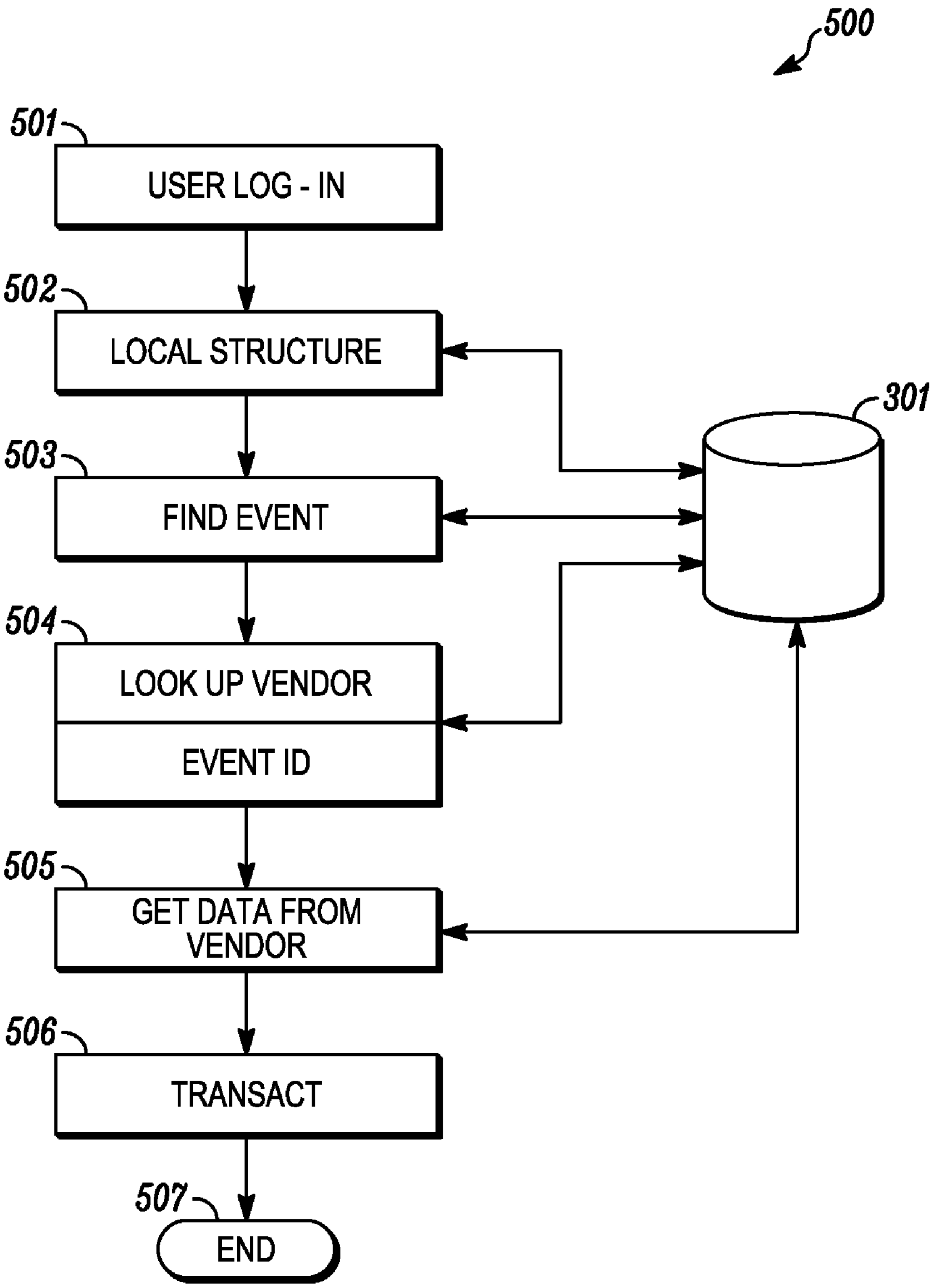
FIG. 5 illustrates an exemplary process flow according to the present embodiment of a user booking an event ticket.

FIG. 5 shows an exemplary process flow 500 according to the present embodiment of a user booking an event ticket. In process 501, the user logs into the system. In process 502, the user parses through the local structure, drawing on data stored in database 301. In process 503, the user finds an event, and in process 504 the system looks up the event to match its event ID against event IDs in the database 301. Then in process 505, the system receives data about the vendor, using either data already stored in local data in database 301 or data collected from the vendor over the Internet 401. In process 506 the user and the vendor conduct a transaction to complete the booking, and in process 507 the process ends.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable media drive). Further, the instructions can be downloaded into a computing device over a data network in a form of compiled and linked version.

Alternatively, the logic to perform the processes as discussed above could be implemented in additional computer and/or machine-readable media, such as discrete hardware components such as large-scale integrated circuits (LSIs) and application-specific integrated circuits (ASICs); firmware such as electrically erasable programmable read-only memory (EEPROMs); and electrical, optical, acoustical and other forms of propagated signals (e.g., carrier waves, infrared signals, digital signals); etc.

The invention claimed is:

1. A computer implemented method comprising:

assigning, via a computing device, a set of vendors to a unified ID for an event, the unified ID representing a set of unique IDs of the vendors;

presenting, via the computing device, for selection a representation corresponding to the unified ID;

in response to the representation of the unified ID being selected, presenting, via the computing device, an offer to select a ticket from a set of tickets for an event offered by the set of vendors;

providing, via the computing device, a local structure;

parsing, via the computing device, the set of vendors; and providing, via the computing device, navigation through event categories.

2. The method of claim 1, further comprising identifying a second set of vendors offering tickets to a second event.

3. The method of claim 2, further comprising assigning to the second set of vendors a second unified ID, the second set of vendors offering tickets to the second event.

4. The method of claim 3, further comprising:

presenting for selection a representation corresponding to the second unified ID; and in response to the representation of the second unified ID being selected, presenting an offer to select a ticket from a set of tickets for the second event, offered by the second set of vendors.

5. The method of claim 4, further comprising assigning a unified ID for a pre-identified category, and assigning to the unified ID for the pre-identified category, separate vendors offering tickets for events within the category.

6. The method of claim 1, wherein the local structure includes the event categories and respective IDs.

7. The method of claim 1, further comprising parsing the local structure.

8. A machine-readable medium having stored thereon a set of instructions which when executed on a computer system cause the computer system to perform a method, the method comprising:

assigning a set of vendors to a unified ID for an event, the unified ID representing a set of unique IDs of the vendors;

presenting for selection a representation corresponding to the unified ID;

in response to the representation of the unified ID being selected, presenting an offer to select a ticket from a set of tickets for an event offered by the set of vendors;

providing a local structure;

parsing the set of vendors; and providing navigation through event categories.

9. The machine-readable medium of claim 8, further comprising identifying a second set of vendors offering tickets to a second event.

10. The machine-readable medium of claim 9, further comprising assigning to the second set of vendors a second unified ID, the second set of vendors offering tickets to the second event.

11. The machine-readable medium of claim 10, further comprising:

presenting for selection a representation corresponding to the second unified ID; and in response to the representation of the second unified ID being selected, presenting an offer to select a ticket from a set of tickets for the second event, offered by the second set of vendors.

12. The machine-readable medium of claim 11, further comprising assigning a unified ID for a pre-identified category, and assigning to the unified ID for the pre-identified category, separate vendors offering tickets for events within the category.

13. The machine-readable medium of claim 8, wherein the local structure includes the event categories and respective IDs.

14. The machine-readable medium of claim 8, further comprising parsing the local structure.

15. A computer system comprising:

at least one server configured to:

assign a set of vendors to a unified ID for an event, the unified ID representing a set of unique IDs of the vendors;

present for selection a representation corresponding to the unified ID;

in response to the representation of the unified ID being selected, present an offer to select a ticket from a set of tickets for an event offered by the set of vendors;

provide a local structure;

parse the set of vendors; and provide navigation through event categories.

16. The computer system of claim 15, wherein the at least one server identifies a second set of vendors offering tickets to a second event.

17. The computer system of claim 16, wherein the at least one server assigns to the second set of vendors a second unified ID, the second set of vendors offering tickets to the second event.

18. The computer system of claim 17, wherein the at least one server:

presents for selection a representation corresponding to the second unified ID; and in response to the representation of the second unified ID being selected, presents an offer to select a ticket from a set of tickets for the second event, offered by the second set of vendors.

19. The computer system of claim 18, wherein the at least one server assigns a unified ID for a pre-identified category, and assigns to the unified ID for the pre-identified category, separate vendors offering tickets for events within the category.

20. The computer system of claim 15, wherein the local structure includes the event categories and respective IDs

* * * * *